Nov. 29, 1966    P. C. KEITH ETAL    3,288,590
CONTINUOUS OXIDE REDUCTION PROCESS
Filed July 22, 1963    3 Sheets-Sheet 1

INVENTORS
PERCIVAL C. KEITH
GEORGE B. FARKAS
HAROLD H. STOTLER
WILLIAM VOLK

BY Nathaniel Ely
ATTORNEY

INVENTORS
PERCIVAL C. KEITH
GEORGE B. FARKAS
HAROLD H. STOTLER
WILLIAM VOLK

BY

ATTORNEY

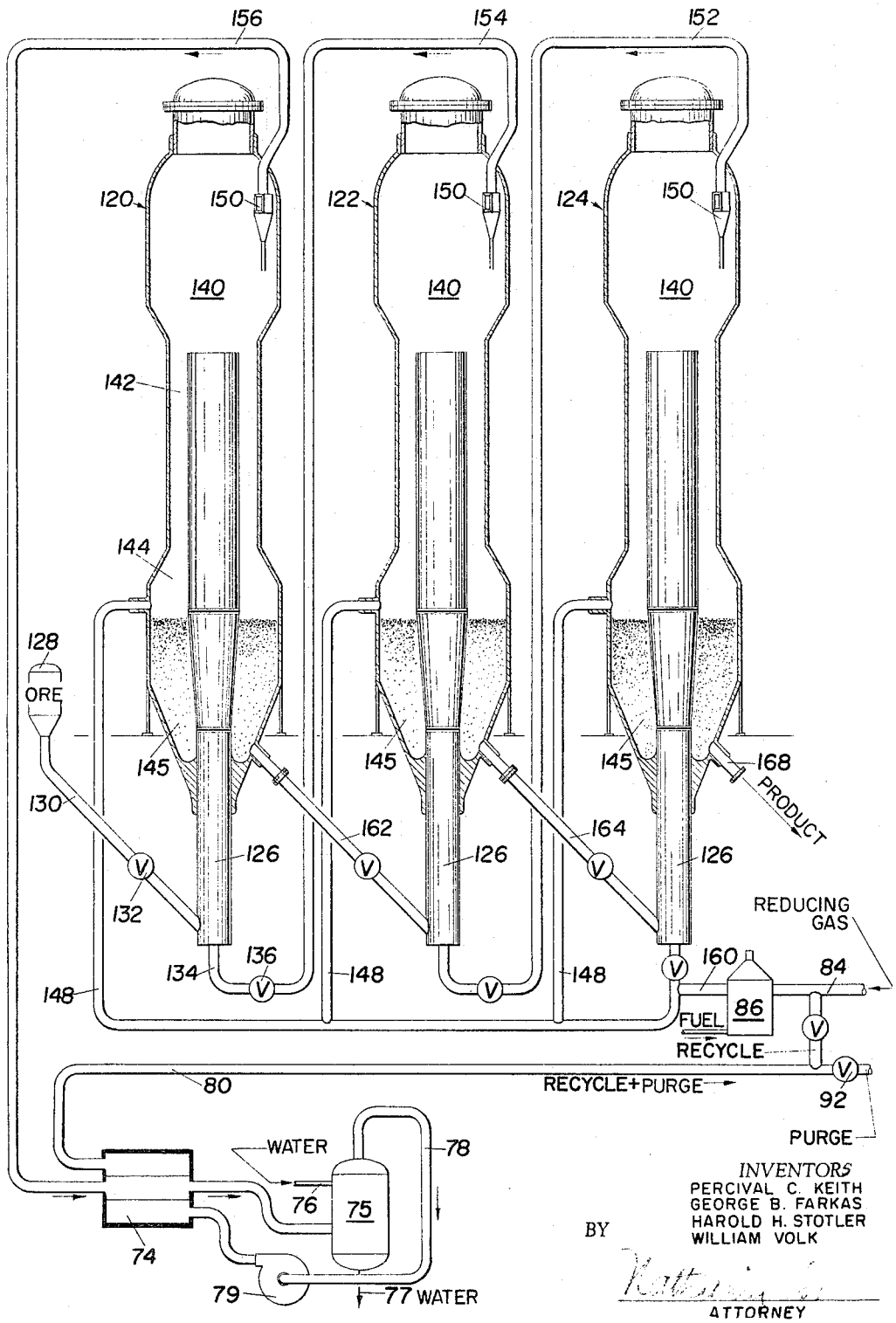

United States Patent Office 3,288,590
Patented Nov. 29, 1966

3,288,590
CONTINUOUS OXIDE REDUCTION PROCESS
Percival C. Keith, Peapack, N.J., George B. Farkas, Jackson Heights, N.Y., and Harold H. Stotler, Westfield, and William Volk, Princeton, N.J., assignors to Hydrocarbon Research, Inc., New York, N.Y., a corporation of New Jersey
Filed July 22, 1963, Ser. No. 296,524
6 Claims. (Cl. 75—26)

This invention relates to an improved process for reducing iron oxide or other metallic oxides with hydrogen or other reducing gases at temperatures below fusion, and is particularly characterized by being operated as a continuous dilute phase system.

The reduction of iron oxide by reducing gases such as hydrogen, carbon monoxide and mixtures thereof, is limited by temperature, pressure, particle size, quantity of reducing gas circulated per pound of iron reduced, and time of contact between the gas and solids. While an effective commercial method for contacting gases and solids has utilized a fluidized bed of solids, such as shown in U.S. Patents 2,900,246 and 2,995,426, the velocity of the gas in such a system is comparatively low and sufficient only to put the solids mass in a turbulent or fluidized condition. Gas to solid contact time is thus provided by supplying sufficiently deep beds of solids and by supplying more than one bed of solids inside the reactor.

In such a system, the gas is usually recycled until the bed of solids is reduced to the desired degree and the solids are then removed from the reactor. Temperatures are limited by the nature of the solids for at some temperatures (below fusion) the iron oxide particles tend to defluidize. Pressure operation permits a larger quantity of gas to contact the solid in a specified size reactor operating at a specified superficial gas velocity.

The fluidized bed treatment for the reduction of iron oxide has been successfully carried out on semi-commercial scale operations, but as the capacity of such a reactor is limited by temperature, pressure and gas velocity, it can be expanded in capacity only by a substantially greater horizontal cross section. For commercial units, suggestions have been made of reactors from 10 to 25 feet in diameter. At the same time, reactors of such size will tend to have extremely great vertical dimensions in which a multiple bed unit may be as much as 125 feet high.

Alternative methods for reducing iron oxide by direct reduction without melting have involved the use of rotary kilns or some form of chamber in which the particles fall through a flowing gas stream, and here again, the volume of the vessel for the volume of ore being reduced is so great as to make the equipment cost prohibitive, particularly if high degrees of reduction are required.

The problem of introducing heat by an externally fired furnace to support the endothermic reaction has also been considered as in Patent No. 2,399,984. A study of this process which, as far as is known, has never been commercialized, also shows serious and critical limitations not only in the physical limitations of the extremely cumbersome apparatus which would be required for any particular quantity of ore to be reduced, but also the extremely limited heat exchange efficiencies which result in exchanging the heat which is necessary for the endothermic heat required for the reduction with the fine ore particles in suspension.

As an example from such patent, upward gas velocities are stated to be in the order of 100 ft./sec. and downward gas velocities in the order of 35 ft./sec. The contact time between the gas and solids is thus only in the order of fractions of a second per pass through tubes of 20 feet in length. Therefore, to achieve a reasonable amount of reduction per pass, temperatures of at least 1500 to 1600° F. are required. In this temperature range, operation of the unit must be limited to low pressures (only slightly above atmospheric pressure) because of limitations on materials of construction. And even at the low pressures, the construction would be extremely expensive. Furthermore, the high gas velocities are required in this apparatus due to the indirect heat exchange method for introducing the endothermic heat of reduction to the system. Only at high gas velocities is it possible to obtain sufficiently high heat transfer coefficients inside the tubes such that the heat requirement can be supplied in the small amount of wall surface which would be available for the transfer of this heat.

The use of a solids-in-suspension system in which the heat is supplied indirectly thus creates a limitation on maximum operating pressure due to the materials of construction, requires high reduction temperatures to achieve reduction in short contact time, and high gas velocities to provide heat transfer rates required for indirectly supplying heat of reduction.

The purpose of our invention is to provide a gas-solids contacting process which will permit the reduction of metallic oxides in less reactor volume, be simpler to construct, less expensive to build, easier to operate, and with greatly improved control over the reaction.

A further object of our invention is to provide a dilute phase suspension process for reducing metallic oxides, particularly iron oxide, with a reducing gas, particularly hydrogen, under temperature conditions substantially below fusion and under pressures of at least ten atmospheres wherein the endothermic heat of reduction is supplied to the reactants directly as sensible heat of the gas.

More particularly our invention concerns an improved continuous process for reducing iron oxide preferably with high purity hydrogen gas which process is easily controlled within a wide range of capacity, is more economical than presently available processes, and is considerably less expensive to construct and operate on a tonnage yield basis.

Further objects and advantages of our invention will appear from the following description of preferred forms of embodiment thereof taken in connection with the attached drawings illustrative thereof and in which:

FIG. 4 is a schematic elevation with parts in section of a modified form of process utilizing supplemental reducing gas.

Figure 1:
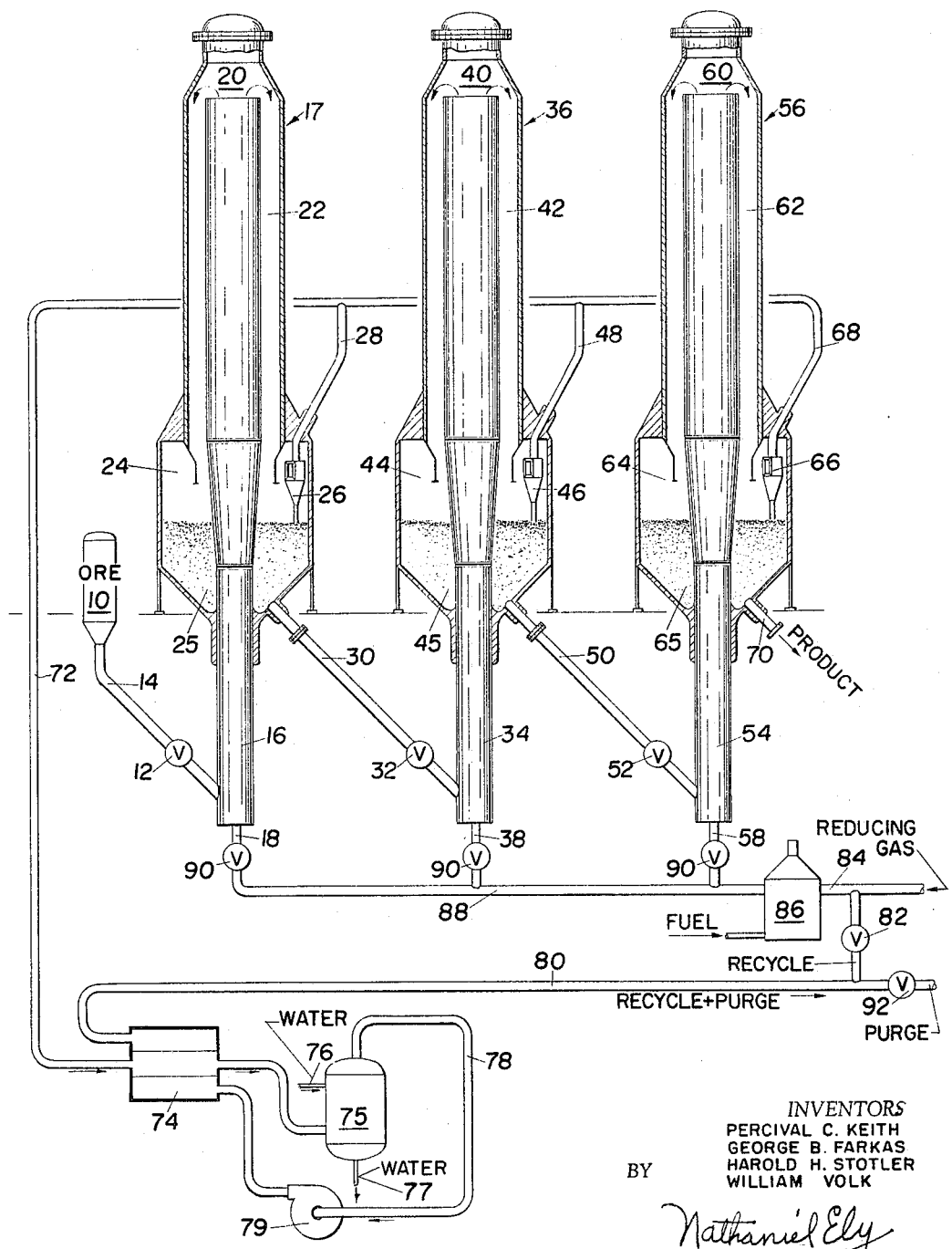
FIG. 1 is a schematic elevation with parts in section of a continuous dilute phase metallic oxide reducing process.

As shown in FIG. 1, finely ground metallic oxide, particularly iron oxide, at least passing 20 mesh (Tyler) and preferably ground to 100% minus 100 mesh, and with an average particle size of preferably 200 mesh, is dried of free moisture and hydrated moisture, and preheated to a temperature in the range of 900° F. to 1350° F. in one of the many conventional methods available. This ore is fed to ore hopper 10 and pressurized to the operating pressure of the reduction system.

By suitable control of valve 12 in the feed line 14, the ore is continuously fed into the low end of a tubular reactor 16 mounted in a reaction unit 17 together with the reducing gas, preferably hydrogen of 85% or more purity which is introduced at 18. As will hereinafter be described, the relative velocity of the reducing gas with respect to the rate of feed of solids not only affects a desired loading of the solids in the gas but will carry the solids in contact with the reducing gas upward through the reactor to the enlarged gas solids separating chamber 20.

With the increased diameter of chamber 20, the partially reduced particles tend to be carried over into the annular zone 22 within unit 17, and to drop into the collection zone 24 forming a limited pile 25. Further separation of gas from solids is accomplished by a cyclone separator or filter schematically indicated at 26, with the particle free gas removed at 28. This gas is unreacted reducing gas and, of course, water vapor formed by the reduction reaction.

Although a substantial reduction of metallic oxide is accomplished in the first reactor, it is preferred commercial practice to accomplish further reduction in separate stages rather than make reactor 16 any longer. In such case, the partially reduced metallic oxide accumulated at 25 will continuously flow through the second feed line 30 under control of valve 32 to the second tubular reactor 34 in reaction unit 36, such reactor 34 being similarly fed with reducing gas at 38. In a similar manner, the upper part 40 of the unit 36 reactor will constitute a solids disengaging zone. Similarly, the solids will drop through annulus 42 within unit 36 for collection in zone 44 again forming a limited pile 45. The collection zone is provided with filters or cyclone separators 46 within the return of solids in the usual manner through the usual dip leg. The effluent gas is removed at 48 and similarly consists of water vapor although of a relatively lower degree than the effluent gas removed at 28, and unreacted reducing gas. This effluent gas is preferably fed into the effluent 28 from the first reaction zone.

As from the first stage, the accumulated reduced metallic oxide collected at 45 in subsequent stages is drawn off through the line 50 and may be product or further treated as desired. If further reduction is desired, it may, in turn, be introduced through valve 52 to subsequent reactors such as indicated at 54 in reaction unit 56, such reactor 54 receiving fresh reducing gas at 58. The reaction unit 56 has a similar solids disengaging zone 60 which discharges the solids through the annulus 62 to the collection zone 64 and forming a pile of solids at 65. The collection zone 64 similarly has a gas separation device 66 with the effluent gas discharging at 68. The metallic oxide reduced to the desired extent is ultimately removed in line 70.

If desired, the gas leaving reactor 56 in line 68, the gas leaving reactor 36 in line 48, and the gas leaving reactor 17 through line 28 are preferably passed by line 72 to heat exchanger 74 for partial cooling and then further cooled and water scrubbed in scrubber 75 with water at 76 to condense water vapor from the recycle gas stream. The excess water is then removed at 77 and the cooled gas at 78 containing less than one-half percent moisture is recompressed at 79 and partially reheated in heat exchanger 74 and then through line 80 and valve 82 joins the fresh hydrogen feed line 84 ahead of heater 86. With the usual operating conditions, it is possible to maintain a quality of at least 85% by volume purity hydrogen at the heater 86 with a recycle hydrogen stream of about 20 to 1 of fresh feed. In each case the high purity and low moisture content reducing gas enters by conduit 88 and valves 90 into each reaction zone. Some purge controlled by valve 92 may be required to limit the build-up of undesired gaseous components which enter the system with the make-up hydrogen.

Although three reaction zones are shown, it is to be understood that there may be less than three if a low degree of reduction is required, or if the separate reaction zones are made of greater vertical height. It is preferable, however, to limit the vertical height of the reactors 16, 34 and 54 to practical limitations as in the order of 25 to 50 feet. Usually, more than three stages of reduction are not desirable except, for example, in the production of highly reduced metals or in the case of particularly refractory oxides in which a limited reduction is possible in any one particular step.

In accordance with our invention, the endothermic heat of reduction is supplied directly by the sensible heat of the reducing gas thereby eliminating indirect heat exchange in the reaction chamber. This can be achieved by operating the reduction system at pressures of 150 p.s.i.g. or higher and preferably at 300 to 500 p.s.i.g. The sensible heat of the gas cannot supply the endothermic heat of reaction when operating at pressures close to atmospheric since the quantity of gas in contact with the solid is so small that the gas temperature would drop too low to permit reduction to take place at a reasonable rate. By operating at 400 p.s.i.g. instead of 30 p.s.i.g., approximately 13 times as much gas will be in contact with the solid and the decrease in gas temperature to supply the same amount of heat will be only about one thirteenth as much.

With high pressure operation as described, the reduction temperature can be decreased markedly from the usual 1500° F. to approximately 900 to 1200° F. to permit the use of lower cost materials of construction. To achieve reduction at these lower temperatures, considerably longer contact time is allowed than formerly. But, since high gas velocities are not needed to provide a reasonable heat transfer coefficient (since heat is supplied directly) the longer contact time can be achieved by markedly decreasing gas velocity.

Decreasing the gas velocities to the order of 5 to 25 ft./sec. has the advantage also of supplying a longer contact time than just by the amount the gas is slowed down. At these low velocities, the solid particles rise up through the tube at a much lower velocity than the gas. This phenomena is shown as "particle slippage." Particle slippage ratio is defined as the ratio of the gas velocity to the solid velocity up through the reaction tube.

Figure 2:
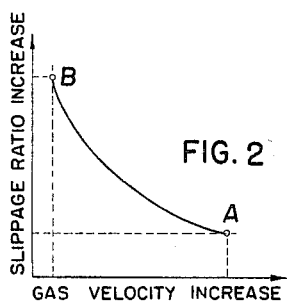
FIG. 2 is a schematic chart showing a relation of slippage to gas velocity.

FIG. 2 is a schematic chart showing a relation of particle slippage ratio to gas velocity for a particular loading of solids. For example, for any particular particle size there is a gas velocity which will carry the particles at substantially the same velocity, i.e., with a "slippage ratio" of approximately 1. For example, with a particle size of 200 mesh and a gas velocity of 100 ft./sec., the solids move up the tube at substantially the same velocity as the gas; see point "A" on FIG. 2. It will also be obvious that at some low velocity, the particles will collect as a bed; see point "B." It is found that if the gas velocity is so low as to permit the bed to form it is impossible to get all the solids out by increasing upward gas velocity. In such an event, the particles must be removed from the bottom of the reaction zone. However, at velocities of 5 to 25 ft./sec., the same size particles would move up the tubes at a velocity a fraction of the velocity of the gas. Therefore, by controlling the gas velocity in the range of 5 to 25 ft./sec. (for 200-mesh particles) in the range between points "A" and "B" the gas-solid contact time can be controlled to a sufficiently long enough time to achieve reasonable amounts of reduction in a reasonable length tube operating in the temperature range of 900 to 1200° F.

Another controllable factor in the reduction process is the endothermic heat and in this respect it is found that by operating with a feed loading of 0.05 to 1.0 pound of solids per cubic foot of gas, it is possible to put in the necessary heat as sensible heat in the gas by operating at pressures of 150 p.s.i.g. or higher. Preferably, the process is operated in the range of 300 to 500 p.s.i.g.

As a preferred example of the operation of the process, the reducing gas is hydrogen having at least 85% purity and not to exceed 15% of inerts of which less than 3% and preferably less than 0.5% is water vapor. Operating conditions in the respective reactors is in the range of 900° to 1200° F. although some especially refractory ores require reduction temperatures as high as 1350° F. The higher temperature is usually in the final stage of reduction when reduction of 95% or better is required. Pressures, as previously mentioned, are usually in the 300 to 500 p.s.i.g. range with a typical hydrogen inlet pressure of 400 p.s.i.g. and an outlet pressure of 385 p.s.i.g. Normally, no pressure boosters are required and it is only necessary to provide a leg of solid in lines 14, 30 and 50 of FIG. 1 to overcome the usual pressure difference in the respective reactors to have a continuous flow of reducing gas and solids through the several reaction zones.

An alternative reducing gas, predominantly hydrogen, but with methane as the principal impurity, can also be used due to the higher heat capacity of the methane. Such a gas may be made from coke oven gas by saturating the unsaturated hydrocarbons in a hydrotreater using part of the contained hydrogen in the gas; the gas is then scrubbed with a suitable solvent to remove any hydrogen sulfide, tars and aromatic hydrocarbon which may be present, after which the carbon monoxide is shifted by the water gas reaction and the gas is then scrubbed with a suitable solvent to remove carbon dioxide. This treated coke oven gas now has a purity of about 70% hydrogen and about 25% methane and is used as the make-up hydrogen stream to the reduction plant. At least 45% hydrogen is then circulated in the recycle gas stream in the reduction plant.

Figure 3:
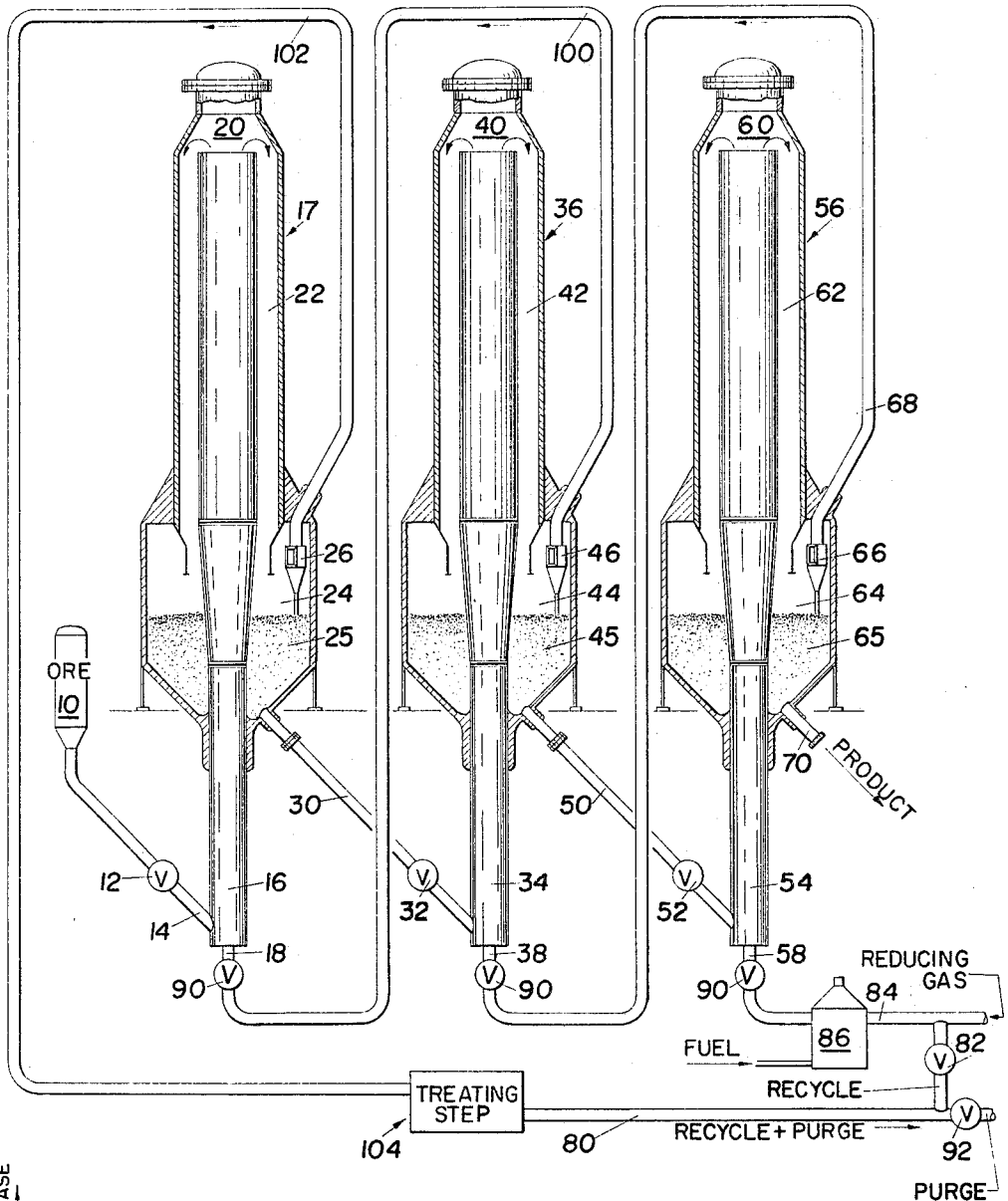
FIG. 3 is a schematic elevation with parts in section of a continuous dilute phase process showing a series flow, rather than parallel flow, of reducing gas.

FIG. 3 shows an alternative method of operation in which the reducing gas is sequentially passed through each of the several reaction zones. In general, the pieces of apparatus which are similar to those shown in FIG. 1 are given the same identifying number.

The reducing gas entering the final reduction unit 56 at 58, after heating the ore, acting as the transport agent, and as the reducing agent, is removed at 68 as in the first case and then passes through valve 90 as the feed gas 38 to the second or intermediate reduction zone 34. In turn, the gas now removed at line 100, thus containing a somewhat higher degree of moisture, passes through a third valve 90 and serves as the gas feed at 18 for the primary reduction stage 16. This gas ultimately discharges at 102 and may pass through a treating zone 104. In the treating zone as in the case of FIG. 1, the hydrogen may be cooled, dehydrated, and then prepared for reuse through line 80 under control of valve 82 mixing with fresh feed at 84 except for a small purge at 92.

As a preferred example of the operation of the process shown in FIG. 3, the reducing gas is also hydrogen having at least 85% purity of which less than 0.5% is water vapor. Gas enters reactor 54 at 1100° F. and leaves at 1050° to 1100° F. Gas then enters reactor 34 at 1050° F. and leaves at 1000° to 1050° F. The temperature in reactor 16 is about 50° F. lower. In reactor 16 the ore is reduced about 60%. In reactor 34 the 60% reduced oxide is reduced to about 90% reduction and in reactor 54 the material is reduced to 95% reduction.

For a 500-ton per day plant, reactors 16, 34, and 54 are each 3 feet 6 inches in inside diameter and are about 80 feet long. Hydrogen is fed to each reactor at a rate of 70 standard cubic feet per pound of iron at a pressure of about 400 p.s.i.g.

While the range of solids particle size is critical with respect to gas velocity, the actual size of the reduced metallic oxides can vary over wide limits based on the initial design of the unit. With a suspension system it is possible to operate with more finely ground ore by further reducing the gas velocity such that the slippage ratio of this size particles falls inside the range of A and B in FIG. 2.

With particles of an average size of 200 mesh, the actual velocity of the gas for the desired slippage ratio for an iron oxide loading of 0.05 to 0.50 pound per actual cubic foot of gas is in the order of 5 to 25 feet per second.

A further modification of our process is shown in FIG. 4 wherein, under certain conditions, we find it especially desirable to introduce supplemental reducing gas for accomplishing somewhat more complete reactions. In this construction, one or more reaction units 120, 122, and 124 are used as is necessary. Each of these includes a central tubular reactor 126, the first of which receives similarly preheated and dried ore under pressure from hopper 128 through line 130 and valve 132. In a similar manner, a reducing gas is introduced to the bottom of the reactor 126 through gas line 134 under control of valve 136 so that there is the desired loading of ore and velocity to accomplish a predetermined slippage ratio.

Also, as in the first case, the ore in suspension in the gas discharges from the open upper end of the reactor into a gas-solids separating chamber indicated at 140. The ore tends to settle in the annular space 142 between the shell of the reaction unit and the reactor tube and drops into the accumulator chamber 144 and ultimately forming a pile 145. However, in this form of embodiment of the invention, we introduce supplemental reducing gas at 148 and take off gaseous products at 150 from the gas-solids separating chamber 140.

As a result of this action, we obtain a secondary reduction in the annular zones 142 due to the contact of the supplementary reducing gas which flows upward and counter to the falling ore and thus materially reduces its settling rate. Inasmuch as the ore which falls through the annular secondary reaction zone is already partially reduced, it is highly desirable that fresh highest purity hydrogen be used to contact it. This is accomplished by utilizing a slip stream 148 from the main stream 160 of heated reducing gas.

Again, as in the prior cases, further reduction may be accomplished in the reactors 122 and 124 which are similarly charged with iron ore and reducing gas through the reactors 126. As indicated, it is contemplated that the reducing gas 160 pass sequentially through the various stages in that the effluent gas removed at 152 from the final stage will be used as the reducing gas for the main reaction in reactor 126 in an intermediate stage. Similarly, the effluent gas 154 from an intermediate stage may be used as the heating, suspension, and reducing gas for the first stage. The effluent at 156 from the first stage will, of course, be treated as in the first case and returned to the feed 84 of fresh reducing gas or purged from time to time by valve 92. The reducing gas 160 preferably has the same characteristics as the reducing gas 58 in the first case.

In some cases it may be desirable to use a solid to gas loading as high as 15-pound solid per cubic foot of gas in the reactor. In those cases, it is possible to supplement the heat supplied as gas sensible heat to the reactor with exothermic heats of reactions which can occur if carbon monoxide is present in the reducing gas stream. Two of these reactions are:

$$CO + 3H_2 \rightarrow CH_4 + H_2O$$
$$2CO + xFe \rightarrow Fe_xC + CO_2$$

While we have shown preferred forms of embodiment of our invention, we are aware that other modifications may be made thereto and we, therefore, desire a broad interpretation of our invention within the scope and spirit of the description herein and of the claims appended hereinafter.

We claim:

1. The method of continuously reducing an iron oxide in particulate solids form with a reducing gas largely hydrogen under dilute phase suspension conditions which comprises (1) grinding said iron oxide to all pass 100 mesh and have an average particle size of about 200 mesh;

(2) heating the reducing gas to a temperature in the range of 900° F. to 1350° F. under a pressure of 150 to 500 p.s.i.g.; (3) passing said gas upwardly through a substantially vertical reaction zone, at a velocity in the range of 5 to 25 feet per second; (4) preheating the iron oxide to at least about 900° F.; (5) continuously feeding the finely divided preheated iron oxide to said rising column of reducing gas at a rate to maintain an average solids density in the range of 0.05 to 15.0 pounds of metallic oxide per cubic foot of gas under the conditions in the rising column, the sensible heat in the gas supplying substantially all of the endothermic heat of the reaction; (6) maintaining sufficient contact time between the reducing gas and the iron oxide to accomplish at least 90% reduction; and (7) separately removing from the effluent of the reaction zone, a substantially solids-free gas and the reduced iron fines.

2. The method of claim 1 wherein the reaction zone consist of a series of vertical chambers forming stages interconnected to accomplish a downflow of gases from the top of one stage interconnected to the upflow in the next stage.

3. The method of reducing a metallic oxide as claimed in claim 1 wherein the reducing gas is made from coke oven gas and the principal impurity is methane.

4. The method of reducing a metal oxide as claimed in claim 1 wherein the metal oxide is iron oxide, the particle size averages will pass 100 mesh, the reducing gas is at least 85% hydrogen, and contains less than ½ percent moisture.

5. The process of reducing iron oxide as claimed in claim 1 wherein the vertical reaction zone is in three stages and the separate stages each receive fresh reducing gas.

6. The process of reducing iron oxide as claimed in claim 1 wherein the vertical reaction zone is in a plurality of stages and the reducing gas passes through the stages in sequence.

References Cited by the Examiner

UNITED STATES PATENTS

| | | | |
|---|---|---|---|
| 2,379,423 | 7/1945 | Cape et al. | 75—35 |
| 2,399,984 | 5/1946 | Caldwell | 75—26 |
| 2,853,361 | 9/1958 | Bryk et al. | 75—26 X |
| 2,900,246 | 8/1959 | Keith et al. | 75—26 |
| 3,022,156 | 2/1962 | Eastman | 75—26 |
| 3,031,293 | 4/1962 | Meissner | 75—26 |
| 3,190,744 | 6/1965 | King | 75—34 |

BENJAMIN HENKIN, *Primary Examiner.*